United States Patent
Williams (10) Patent No.: US 9,322,649 B2
(45) Date of Patent: Apr. 26, 2016

(54) TOROIDAL LINK FOR RPM MEASUREMENT

(71) Applicant: Halliburton Energy Services, Inc., Houston, TX (US)

(72) Inventor: Percival F. Williams, Cheltenham (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/430,756

(22) PCT Filed: Sep. 3, 2013

(86) PCT No.: PCT/US2013/057804
§ 371 (c)(1),
(2) Date: Mar. 24, 2015

(87) PCT Pub. No.: WO2015/034460
PCT Pub. Date: Mar. 12, 2015

(65) Prior Publication Data
US 2015/0253135 A1 Sep. 10, 2015

(51) Int. Cl.
| | |
|---|---|
| *G01V 3/00* | (2006.01) |
| *G01C 9/02* | (2006.01) |
| *E21B 44/00* | (2006.01) |
| *E21B 4/02* | (2006.01) |
| *E21B 45/00* | (2006.01) |
| *G01V 3/26* | (2006.01) |
| *G01V 5/04* | (2006.01) |

(52) U.S. Cl.
CPC ... *G01C 9/02* (2013.01); *E21B 4/02* (2013.01); *E21B 44/00* (2013.01); *E21B 45/00* (2013.01); *G01V 3/26* (2013.01); *G01V 5/04* (2013.01)

(58) Field of Classification Search
CPC ............ G01V 3/18; G01V 3/34; G01V 3/38; G01V 1/52; G01V 5/04; E21B 47/00; E21B 4/02; E21B 7/062

USPC ............ 324/346, 333, 334, 338, 339; 175/50, 175/57, 107
See application file for complete search history.

(56) References Cited

U.S. PATENT DOCUMENTS

| | | | |
|---|---|---|---|
| 4,525,715 A * | 6/1985 | Smith ............. | E21B 47/122 175/50 |
| 5,467,832 A | 11/1995 | Orban et al. | |
| 7,084,782 B2 | 8/2006 | Davies et al. | |

(Continued)

FOREIGN PATENT DOCUMENTS

WO    2012/166931 A2    12/2012

OTHER PUBLICATIONS

International Search Report and Written Opinion issued in related PCT Patent Application No. PCT/US2013/057804, mailed May 23, 2014, 10 pages.

*Primary Examiner* — Tung X Nguyen
*Assistant Examiner* — Giovanni Astacio-Oquendo
(74) *Attorney, Agent, or Firm* — Alan Bryson; Baker Botts L.L.P.

(57) ABSTRACT

A measurement-while-drilling system includes a lower toroid, wherein the lower toroid has a lower toroid winding and is adapted to engage a mud motor shaft and is further adapted to receive a signal from one or more sensors and an upper toroid, wherein the upper toroid has a upper toroid winding; and a magnet disposed along the mud motor shaft within the lower toroid. The lower toroid and the upper toroid are disposed so that a signal from the lower toroid is induced in the upper toroid. The lower toroid winding is non-uniform so that the signal induced in the upper toroid is indicative of a rotation rate of the mud motor shaft.

20 Claims, 5 Drawing Sheets

(56) References Cited

U.S. PATENT DOCUMENTS

| | | | | | |
|---|---|---|---|---|---|
| 7,755,361 | B2 * | 7/2010 | Seydoux | ............... | G01V 3/28 324/333 |
| 8,049,508 | B2 * | 11/2011 | Gorek | ............... | G01V 3/28 324/338 |
| 2002/0196018 | A1 | 12/2002 | Wisler et al. | | |
| 2005/0209782 | A1 | 9/2005 | Moriarty | | |
| 2006/0086536 | A1 | 4/2006 | Boyle et al. | | |
| 2010/0224356 | A1 | 9/2010 | Moore | | |
| 2011/0278066 | A1 | 11/2011 | Konschuh et al. | | |

* cited by examiner

TOROIDAL LINK FOR RPM MEASUREMENT

BACKGROUND

The present disclosure relates generally to subterranean drilling operations and, more particularly, to measuring the shaft rotation speed.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

In certain directional drilling applications, a downhole mud motor is used to apply rotation to a drill bit, rather than rotation being applied from the surface to an entire drill string, as in a convention drilling operation. It may be useful to collect information on the formation being drilled and the drilling operation itself while the mud motor is engaged and drilling. Such information can be used to monitor the progress of the drilling operation and to make adjustments for the successful completion of the operation.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present disclosure relates generally to subterranean drilling operations and, more particularly, to stabilizing drill bit, drill string, and/or downhole tools from lateral vibration and stick-slip.

Figure 1:
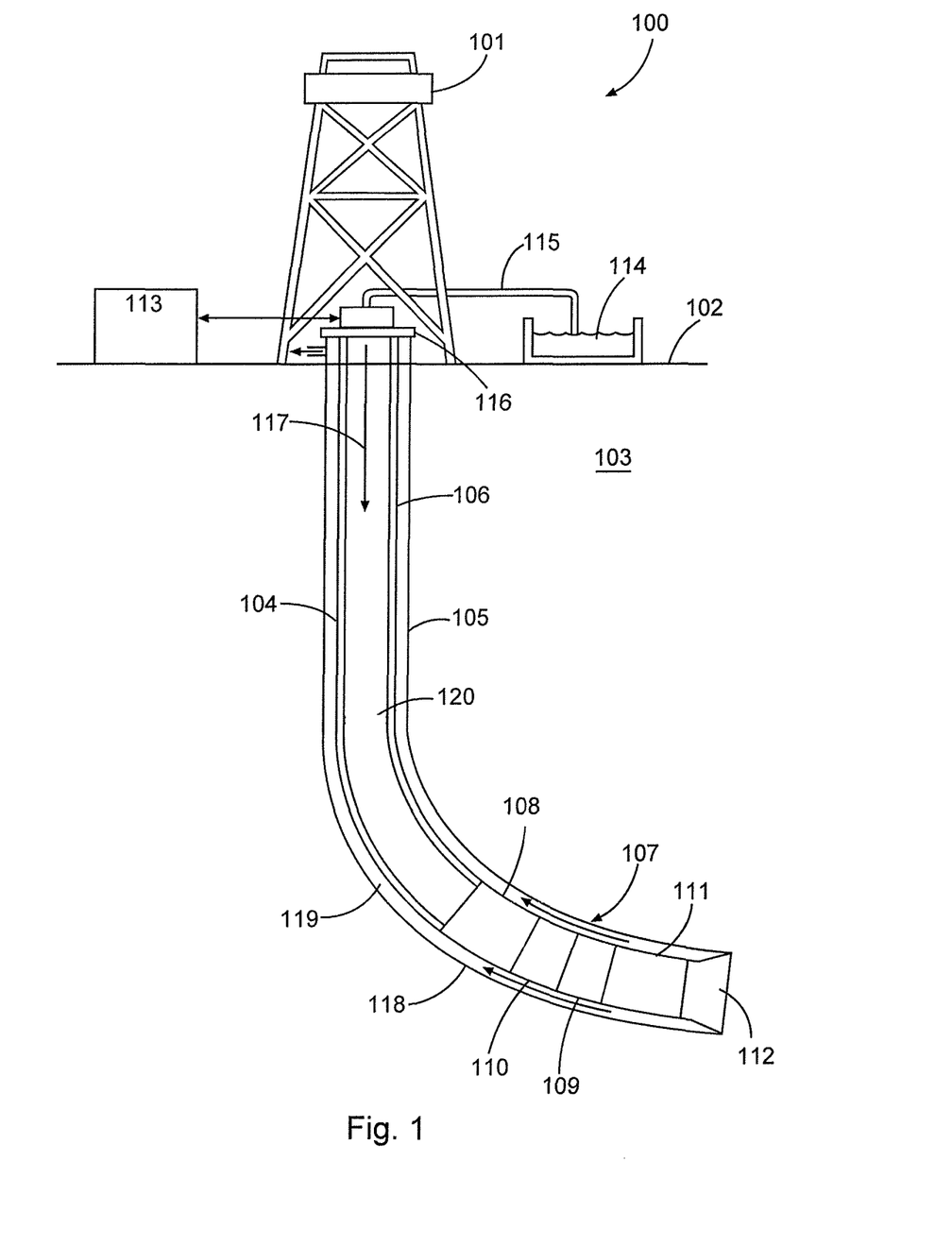
FIG. 1 is a diagram of an example drilling system, according to aspects of the present disclosure.

FIG. 1 is a diagram illustrating an example directional drilling system 100, according to aspects of the present disclosure. As used herein, a directional drilling system may be a subterranean drilling system in which at least one of an inclination or an azimuthal orientation of the drill bit is purposely deviated to contact, penetrate, or intersect a target. For example, directional drilling systems may be used to penetrate a subterranean reservoir to produce hydrocarbons. Directional drilling systems may also be used to follow an existing borehole within a formation or to intersect an existing well that has blown out.

In the embodiment shown, the directional drilling system 100 comprises a rig 101 positioned at the surface 102 above a formation 103. Although the rig 101 is shown on land in FIG. 1, the rig 101 may be used at sea, with the surface 102 comprising a drilling platform. The rig 101 may be coupled to a drilling assembly 104 that is drilling a borehole 105 within the formation 103. The drilling assembly 104 may comprise a drill string 106, a bottom hole assembly (BHA) 107, and a bent sub 108. The drill string 106 may comprise a plurality of tubulars that are coupled together through threaded connections. The BHA 107 may comprise one or more LWD or MWD systems 109, a telemetry system 110, a mud motor and surrounding packages 111, and a drill bit 112. The bent sub 108 may comprise a joint with a fixed or variable angle that controls at least one of the inclination and azimuthal direction of the drilling assembly 104 generally, and the drill bit 112 in particular. In certain embodiments, the bent sub 108 may be incorporated into the BHA 107 or positioned at a different location along the drill string 106. In certain embodiments, the direction drilling system 100 may comprise a mud motor that includes a bent housing rather than the separate bent sub 108 shown in FIG. 1.

The LWD/MWD system 109 may comprise downhole measurement or logging instruments, including magnetometers, accelerometers, antennas, etc. The telemetry system 110 may provide a communications pathway between the LWD/MWD system 109 and other downhole system and the surface control unit 113. For example, the telemetry system 110 may comprise a mud pulser that communicates with the surface control unit 113 through a series of pressure pulses within drilling mud in the borehole 105.

In the embodiment shown, the surface control unit 113 may comprise an information handling system. As used herein, information handling systems may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of non-volatile memory. Additional components of the information handling system may include one or more disk drives, one or more network ports, for communication with external devices as well as various input and output (I/O) devices, such as a keyboard, a mouse, and a video display. The information handling system may also include one or more buses operable to transmit communications between the various hardware components.

During drilling operations, drilling mud may be pumped from a reservoir 114 into a bore 120 of the drilling assembly 104 through a pipe 115. Once introduced into the bore 120 of the drilling assembly 104, the drilling mud may flow away from the surface as shown with arrow 117. The drilling mud may exit the drilling assembly 104 through fluid ports within the drill bit 112. As the drilling mud exits the drill bit 112, it may lubricate and cool the cutting face of the drill bit 112 and carry cuttings from the drill bit 112 to the surface 102. The drilling mud 115 may flow to the surface 102, as shown with arrow 118, within an annulus 119 between the drilling assembly 104 and the wall of the borehole 105.

The mud motor and surrounding packages 111 may include at least one element within the flow of drilling fluid 117 that converts energy from the flow of drilling fluid 117 into rotary motion. For example, the mud motor and surrounding packages 111 may include a turbine that rotates in response to a fluid flow. The turbine may drive an output shaft that may be coupled, directly or indirectly through gear assemblies and other drive elements, to drill bit 112. Accordingly, when drilling mud is being pumped into the drilling assembly 104, the drill bit 112 may rotate and cut into formation 103. Notably, by rotating the drill bit 112 with the mud motor and surrounding packages 111 rather than the drill string 106, the azimuthal orientation of the bent sub 108 and the drill bit 112 may remain substantially constant while the borehole 105 is being drilling. However, when the rate of penetration of the drilling assembly 104 is low, part of the drill string 106 may become stationary, causing static friction to form between the drill string 106 and the wall of the borehole 105. This static friction must be overcome before drilling can continue.

According to aspects of the present disclosure, the static friction generally may be avoided or reduced by continuously rotating the drill string 106. In certain embodiments, the input torque may be optimized so that it is the minimum input torque required to continuously rotate the drill string 106 without rotating the drill bit 112, which would alter its azimuthal orientation. The optimized torque/rotation may be alternatively imparted in a first direction and a second direction to allow for a substantially continuous rotation without rotating the drill bit. In certain embodiments, the minimum input torque may be applied to the drill string 106 through a top drive 116 coupled to the drill string 106. The top drive 116 may be coupled to surface control unit 113 and may comprise a motor that imparts torque to the drill string 106 based, at least in part, on a command signal generated by the surface control unit 113. For example, the top drive 116 may include a controller that receives the command signal from the surface control unit 113 and causes the motor within the top drive 116 to impart a certain torque to the drill string 106. In other embodiments, the command signal from the surface control unit 113 may control the motor directly. In other embodiments, the command signal may be generated at an information handling system incorporated within the top drive 106.

Figure 2:
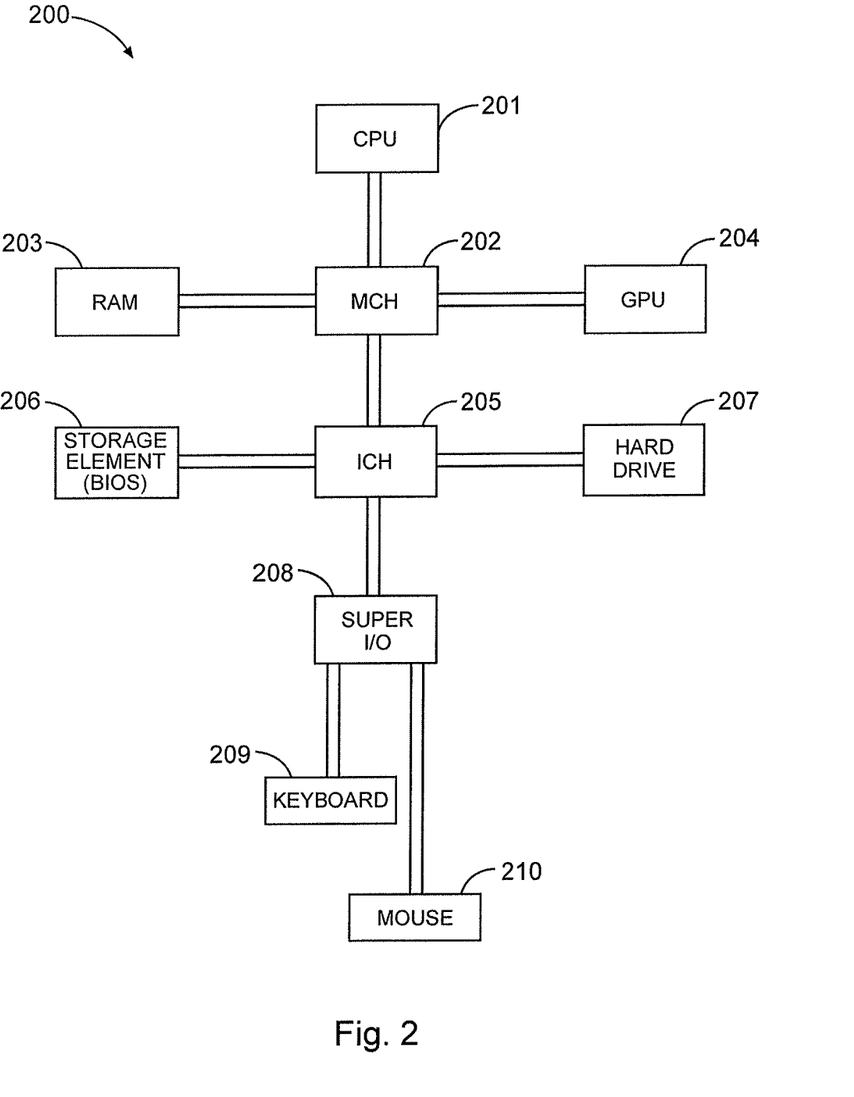
FIG. 2 is a diagram illustrating an example information handling system, according to aspects of the present disclosure.

FIG. 2 is a block diagram showing an example information handling system 200, according to aspects of the present disclosure. Information handling system 200 may be used, for example, as part of a control system or unit for a drilling assembly. For example, a drilling operator may interact with the information handling system 200 to alter drilling parameters or to issue control signals to drilling equipment communicably coupled to the information handling system 200. The information handling system 200 may comprise a processor or CPU 201 that is communicatively coupled to a memory controller hub or north bridge 202. Memory controller hub 202 may include a memory controller for directing information to or from various system memory components within the information handling system, such as RAM 203, storage element 206, and hard drive 207. The memory controller hub 202 may be coupled to RAM 203 and a graphics processing unit 204. Memory controller hub 202 may also be coupled to an I/O controller hub or south bridge 205. I/O hub 205 is coupled to storage elements of the computer system, including a storage element 206, which may comprise a flash ROM that includes a basic input/output system (BIOS) of the computer system. I/O hub 205 is also coupled to the hard drive 207 of the computer system. I/O hub 205 may also be coupled to a Super I/O chip 208, which is itself coupled to several of the I/O ports of the computer system, including keyboard 209 and mouse 210. The information handling system 200 further may be communicably coupled to one or more elements of a drilling assembly though the chip 208.

The present disclosure in some embodiments provides methods and systems for measuring the rotation rate of a mud motor and surrounding packages 111 based on an arrangement of a coupling set of toroids within the drillstring.

Figure 3:
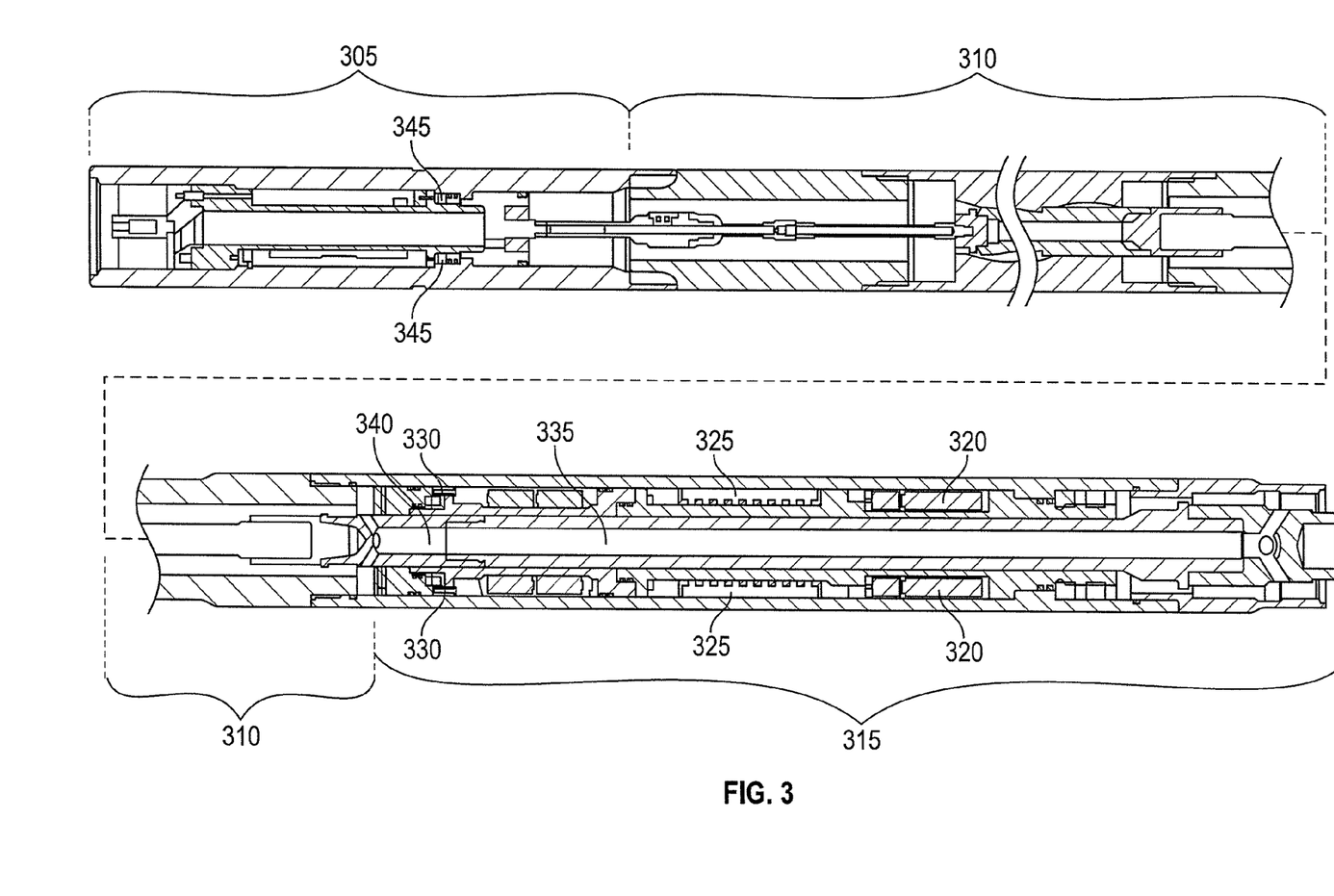
FIG. 3 is a block diagram of an example system, according to aspects of the present disclosure.

FIG. 3 is a block diagram of an example mud motor and surrounding packages 111. The example mud motor and surrounding packages 111 includes an upper section 305, a lower section 315, and a power section 310.

The power section 310 may also be referred to as the mud motor and includes a mud motor rotor. Example mud motor rotors have a helical male metal structure enclosed within a housing (e.g., the stator) which is also helical (female), but which has one extra lobe. As mud is passes down the housing, it causes the rotor to rotate and turn the mud motor shaft 335. Mud motor shaft passes though lower section 315 and to drill bit 112.

In one example embodiment the mud motor and surrounding packages 111 is within a 6.75 inch section. In certain example embodiments, the lower section 310 includes, or is coupled to, one or more sensors. Example sensors include one or more gamma sensors 320. Example implementations include four gamma ray sensors oriented in different directions to sense gamma rays around the mud motor 111. Other example implementations include one or more at-bit inclination sensors 325 to determine the inclination of the mud motor and surrounding packages 111 or of the bit during drilling operations. Example at-bit inclination sensors 325 include one or more tri-axial accelerometers. Other example sensors include one or more of highly focused ultrasonic sensors for obtaining acoustic reflective images of the borehole wall, electrodes for measuring small variations in the resistivity of the formation around the borehole, small high frequency antennas sensitive to the local electromagnetic response of the formation or to fields generated as a result of the drilling process, short range highly focused gamma or x-ray scattering sensors, rapid chemical sensors, and Micro-Electro-Mechanical Systems (MEMS).

The mud motor shaft 335 passes thought toroid 330 (in the lower section 315). Each of toroids 330 and 345 is wound with a number of turns of wire. In certain example embodiments, each of toroids 330 and 345 is wound with the same number of turns of wire. Example embodiments feature 125 turns of wire on both toroids 330 and 345. Other example embodiments may have more or fewer turns of wire on toroids 330 and 345. The outputs from one or more of the sensors that are located in, or that are coupled to, lower section 315 output signals to toroid 330. Toroid 330, in turn, induces a signal in toroid 345. In certain example embodiments, the signal induced in toroid 345 is processed in one or more processors along the drillstring. In other example embodiments, the signal induced in toroid 345 is relayed to the surface control unit 113 for further analysis or processing.

Figure 4A:
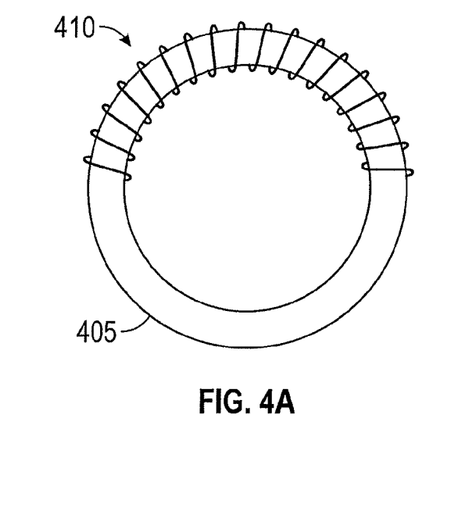
FIGS. 4A, 4B, and 4C are example toroids according to aspects of the present disclosure.
Figure 4B:
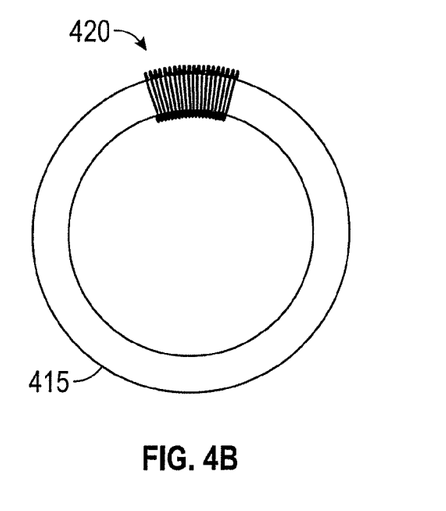

Example embodiments of toroids 330 and 345 have uniform spacing of the turn of wire on the toroids 330 and 345. Other example embodiments of the present system, however, include non-uniform winding of one or both of toroids 330 and 345. In these embodiments, magnet 340 is mounted to the mud motor shaft 335 within or near toroid 330, such that the field of magnet 340 couples with the field of toroid 330 and, in turn, alters the signal that is induced in toroid 345 by toroid 330 in a manner that is indicative of the rate of rotation. Example systems therefore perform signal processing to detect the alteration of the signal induced in toroid 345 by a signal in toroid 330 to determine a rate of rotation of the mud motor shaft 335. Example embodiments of toroid 345 are shown in FIGS. 4A, 4B, and 4C.

Figure 4C:
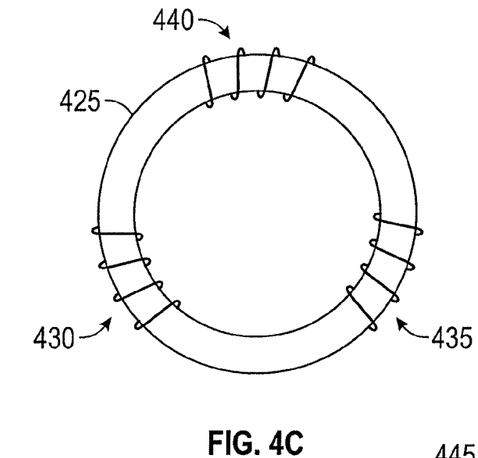

FIG. 4C is an example toroid 425 wound with 125 turns of wire arranged in three segments 430, 435, and 440 evenly spaced over the toroid 425. In the case of a magnet turning inside toroid 425 at approximately 1100 rotations per minute (RPM), the example toroid 425 has a signal output of approximately 150 mV peak-to-peak with a frequency that is three times as great as the RPM of the magnet. An example surface control unit 113 determines the RPM of the mud motor shaft 335 based on the frequency of the measured signal and further based on the toroid winding configuration. In this case, the surface control unit 113 would recognize that each rotation of the mud motor shaft 335 results in a signal with three times the frequency.

Figure 4D:
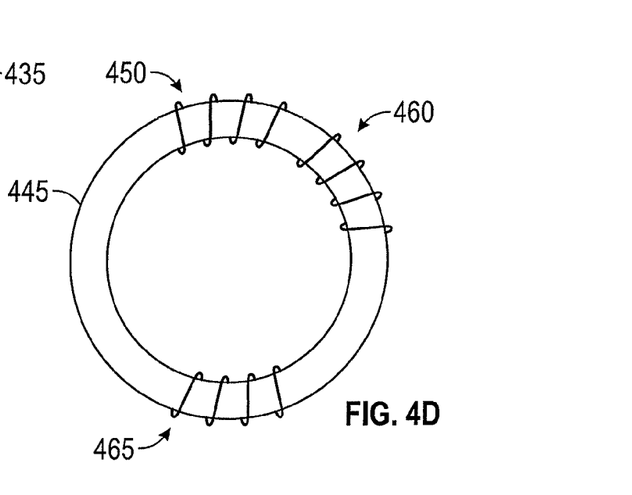

FIG. 4D is an example toroid 445 wound with 125 turns of wire arranged in three segments 450, 460, and 465 at 0 degrees, 60 degrees, and 180 degrees. With such configuration, the system can determine both a rate of rotation and a direction of the rotation. In such a configuration the time between pulses would be T, 2 T, and 3 T for clockwise rotation or 3 T, 2 T, and T for anti-clockwise rotation. Example embodiments of surface control unit 113 include executable instructions to detect the timing between pulses in addition to the timing of the pulses. In this way, the example surface control unit 113 determines both a rate of rotation of the mud motor shaft 335 and a direction of rotation of the mud motor shaft 335.

In other implementations, three or more magnets may be disposed on the mud motor shaft 335 within the lower toroid 330. In this case, the lower toroid 330 has a single segment winding, such as the windings shown in FIG. 4A or 4B to be capable of detecting both the rate of rotation and the direction of rotation of the mud motor shaft 335.

FIG. 4A shows an example toroid 405 with a half-winding configuration where segment 410 including 125 turn of wire wound around approximately half of the toroid 405. In example embodiments, the toroid 410 may output approximately 100 mV peak-to-peak when a magnet is turned inside toroid 410. The frequency of the output of toroid 405 is equal to the frequency of rotation of the magnet. An example surface control unit 113 determines the RPM of the mud motor shaft 335 based on the frequency of the measured signal and further based on the toroid winding configuration. In this case, the surface control unit 113 would recognize that each rotation of the mud motor shaft 335 results in a signal with an equal frequency.

FIG. 4B shows an example toroid 415 with a small-segment winding 420 that includes 125 turns of wire around a small segment of toroid 415. In example embodiments, the toroid 420 may output approximately 200 mV peak-to-peak when a magnet is turned inside toroid 420. The frequency of the output of toroid 405 is matched with the frequency of rotation of the magnet. An example surface control unit 113 determines the RPM of the mud motor shaft 335 based on the frequency of the measured signal and further based on the toroid winding configuration. In this case, the surface control unit 113 would recognize that each rotation of the mud motor shaft 335 results in a signal with an equal frequency. Example embodiments may include tighter winding of segments to increase the peak-to-peak voltage cause by each rotation of the mud motor shaft 335.

Other example embodiments include a Hall Effect switch mounted to the collar of the mud motor 111. As the magnet 340 passes over the Hall Effect switch, pulses are produced which can be counted and the frequency of the pulses is proportion to the speed of the mud motor shaft 335. The use two or more unevenly space Hall effect devices can be used to detect both the rate of rotation of mud motor shaft 335 as well as the direction of rotation of mud motor shaft 335. In other example embodiments, a linear Hall Effect device is connected to a comparator. In still other example embodiments, a coil with an axis radial to the mud motor shaft 335 is used in place of the Hall Effect switch. Example embodiments include amplification circuitry and comparator circuitry connected to the coil.

Other example implementations feature toroid 345 (of the upper portion 305) around a rotating member with one or more magnet in or near toroid 345, such that the field of the magnet couples with the field of toroid 345. Such implementations may include three or more magnets within toroid 345 and unevenly distributed so that both the rate of rotation and direction of rotation of the rotation member within toroid 345 may be measured. In certain embodiments, the upper toroid 345 has a single segment winding, such as the windings shown in FIG. 4A or 4B to be capable of detecting both the rate of rotation and the direction of rotation of the mud motor shaft 335.

Figure 5:
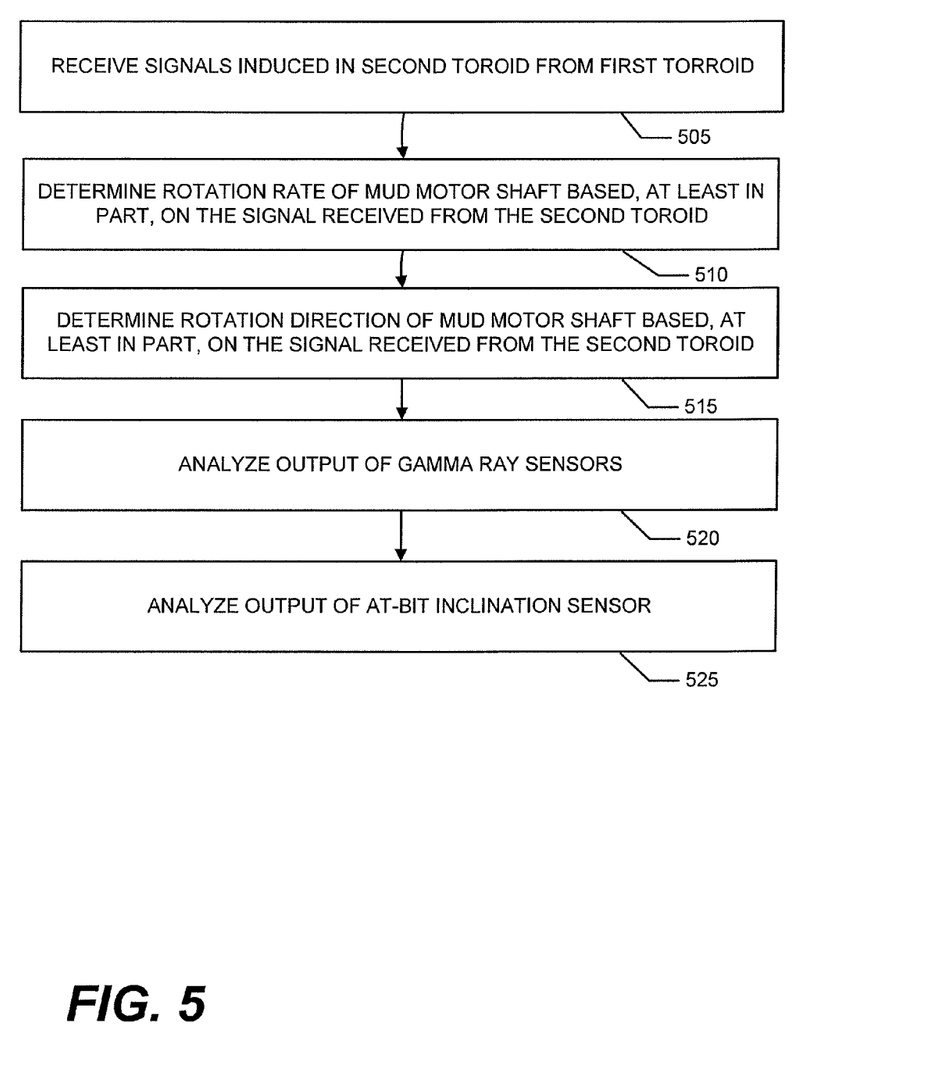
FIG. 5 is a flow chart of an example method according to aspects of the present disclosure.

FIG. 5 is a flow chart of an example signal analysis method for use with the mud motor and surrounding packages 111 discussed above. The surface control unit 113 receives signals induced in the toroid 345 from the toroid 330 (block 505). In some example embodiments, the surface control unit 113 is further programmed with information related to the coil winding configuration of toroid 345, for example, the resulting frequency output on toroid 345 for each rotation of mud motor shaft 335. The surface control unit 113 determines the rotation rate of the mud motor shaft 335 based on the received signals from the toroid 345 (block 510). In some implementations, the surface control unit 113 determines the rotation direction of the mud motor shaft 335 based on the received signals from the toroid 345 (block 515). As discussed above, non-uniform spaced winding segments are used to create signals that indicate both a rate and a direction of rotation. In other embodiments, non-uniformly distributed magnets on mud motor shaft 335 may also be used to detect both the rate and direction of rotation. In some implementations, the surface control unit 113 analyzes the output of one or more sensors that are output to toroid 345. In some example implementations, the surface control unit 113 analyzes the output of one or more gamma sensors 320 to determine, for example, one or more formation properties (block 520). In other example implementations, the surface control unit 113 analyzes the output of one or more at-bit inclination sensors 325 (block 525).

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A measurement-while-drilling system, comprising:
 a lower toroid, wherein the lower toroid has a lower toroid winding and is further adapted to receive a signal from one or more sensors;
 an upper toroid, wherein the upper toroid has a upper toroid winding; and
 a magnet disposed along a rotating member within one of the lower toroid or the upper toroid; wherein:
 one of the lower toroid or the upper toroid is further adapted to engage the rotating member;
 the lower toroid and the upper toroid are disposed so that a signal from the lower toroid is induced in the upper toroid; and
 the lower toroid winding is non-uniform so that the signal from the lower toroid induced in the upper toroid is indicative of a rotation rate of the rotating member.

2. The measurement-while-drilling system of claim 1, wherein the rotating member includes a mud motor shaft;
 the lower toroid is adapted to engage the mud motor shaft; and
 the lower toroid winding is a single segment winding over less than the entire lower toroid.

3. The measurement-while-drilling system of claim 1, wherein the rotating member includes a mud motor shaft;
 the lower toroid is adapted to engage the mud motor shaft; and
 the lower toroid winding is in two or more segments.

4. The measurement-while-drilling system of claim 1, wherein the rotating member includes a mud motor shaft;
 the lower toroid is adapted to engage the mud motor shaft; and
 the lower toroid winding is in three or more segments and wherein the three or more segments are unevenly spaced along the toroid.

5. The measurement-while-drilling system of claim 1, wherein the upper toroid winding is a non-uniform winding, causing the signal induced in the upper toroid to be further indicative of a rotation rate and a rotation direction of the rotating member.

6. The measurement-while-drilling system of claim 1, wherein the one or more sensors include at least one gamma ray sensor.

7. The measurement-while-drilling system of claim 1, wherein the one or more sensors include four gamma ray sensors.

8. The measurement-while-drilling system of claim 1, wherein the one or more sensors include an at-bit inclination sensor.

9. The measurement-while-drilling system of claim 1, wherein the one or more sensors include four gamma ray sensors and an at-bit inclination sensor.

10. A computer program stored in a non-transitory tangible medium, the computer program including executable instructions that cause at least one processor to:
- receive a signal induced in an upper toroid from a lower toroid; and
- determine a rotation rate of a mud motor shaft based, at least in part, on the received signal; wherein:
- the lower toroid and the upper toroid are arranged so that a signal from the lower toroid is induced onto the upper toroid;
- the lower toroid has a non-uniform winding and is adapted to engage a mud motor shaft and is further adapted to receive a signal from one or more sensors; and
- at least one magnet is disposed along the mud motor shaft within the lower toroid.

11. The computer program of claim 10, wherein the non-uniform winding of the lower toroid is a single segment winding over less than the entire lower toroid.

12. The computer program of claim 10, wherein the non-uniform winding of the lower toroid is in two or more segments.

13. The computer program of claim 10, wherein the non-uniform winding of the lower toroid is in three or more segments.

14. The computer program of claim 10, wherein the non-uniform winding of the lower toroid is a non-uniform winding and wherein the executable instructions that cause at least one processor to determine a rotation rate of a mud motor shaft based, at least in part, on the received signal from the upper toroid further cause the processor to determine a rotation direction of the mud motor shaft.

15. The computer program of claim 10, wherein the one or more sensors include a plurality of gamma ray sensors and an at-bit inclination sensor and wherein the executable instructions further cause at least one processor to receive and analyze the output of the gamma ray sensors and the at-bit inclination sensor.

16. A system, comprising:
- a drillstring, including a mud motor unit, the mud motor unit comprising:
- a power section to turn a mud motor shaft, wherein the mud motor shaft passes through a lower unit to a drill bit;
- lower toroid winding and is adapted to engage the mud motor shaft and is further adapted to receive a signal from one or more sensors;
- an upper unit comprising an upper toroid, wherein the upper toroid has an upper toroid winding; and
- at least one magnet disposed along the mud motor shaft within the lower toroid; wherein:
- the lower toroid and the upper toroid are disposed so that a signal from the lower toroid is induced in the upper toroid; and
- the lower toroid winding is a non-uniform winding so that the signal from the lower toroid induced in the upper toroid is indicative of a rotation rate of the mud motor shaft;
- one or more processors; and
- at least one memory, the memory including a computer program stored in a non-transitory tangible medium, the computer program including executable instructions that cause at least one processor to:
- receive a signal induced in the upper toroid from the lower toroid; and
- determine a rotation rate of a mud motor shaft based, at least in part, on the received signal induced in the upper toroid from the lower toroid.

17. The system of claim 16, wherein the lower toroid winding is in two or more segments.

18. The system of claim 16, wherein the lower toroid winding is in three or more segments.

19. The system of claim 16, wherein the lower toroid winding is a non-uniform winding and wherein the executable instructions that cause at least one processor to determine a rotation rate of a mud motor shaft based, at least in part, on the received signal induced in the upper toroid from the lower toroid further cause the processor to determine a rotation direction of the mud motor shaft.

20. The system of claim 16, wherein the one or more sensors include a plurality of gamma ray sensors and an at-bit inclination sensor and wherein the executable instructions further cause at least one processor to receive and analyze the output of the gamma ray sensors and the at-bit inclination sensor.

* * * * *